United States Patent [19]

Müller

[11] 4,253,446
[45] Mar. 3, 1981

[54] STORAGE RESERVOIRS FOR LIQUIDS HEATABLE BY SOLAR ENERGY

[75] Inventor: Bernd Müller, Diekholzen, Fed. Rep. of Germany

[73] Assignee: Vama Vertrieb von Anlagen und Maschinen GmbH & Co. KG, Fed. Rep. of Germany

[21] Appl. No.: 888,065

[22] Filed: Mar. 20, 1978

[30] Foreign Application Priority Data

Mar. 23, 1977 [DE] Fed. Rep. of Germany ....... 2712822

[51] Int. Cl.³ .............................................. F24J 3/02
[52] U.S. Cl. .................................... 126/435; 126/437; 126/427
[58] Field of Search ............... 126/270, 271, 400, 437, 126/427, 435, 432, 450; 237/1 A; 165/106, 18, 104 S

[56] References Cited

U.S. PATENT DOCUMENTS

| 2,553,302 | 5/1951 | Cornwall | 126/422 |
| 3,960,136 | 6/1976 | Moan et al. | 126/270 |
| 4,027,821 | 6/1977 | Hayes | 126/271 |
| 4,037,785 | 7/1977 | Madern | 126/400 |
| 4,055,055 | 10/1977 | Horwitz | 126/400 |
| 4,079,726 | 3/1978 | Voelker | 126/424 |

Primary Examiner—James C. Yeung
Attorney, Agent, or Firm—Townsend and Townsend

[57] ABSTRACT

A storage reservoir for a domestic hot water supply is divided into an upper stand-by tank, including an auxiliary heating device, from which hot water is drawn and a lower tank which includes a heat exchanger connectable to a solar energy receiving circuit. The separating wall includes two flow orifices communicating between the two tanks which ensures cold water is present at the heat exchanger thus enabling optimum transfer of the energy available from the solar receiver.

9 Claims, 1 Drawing Figure

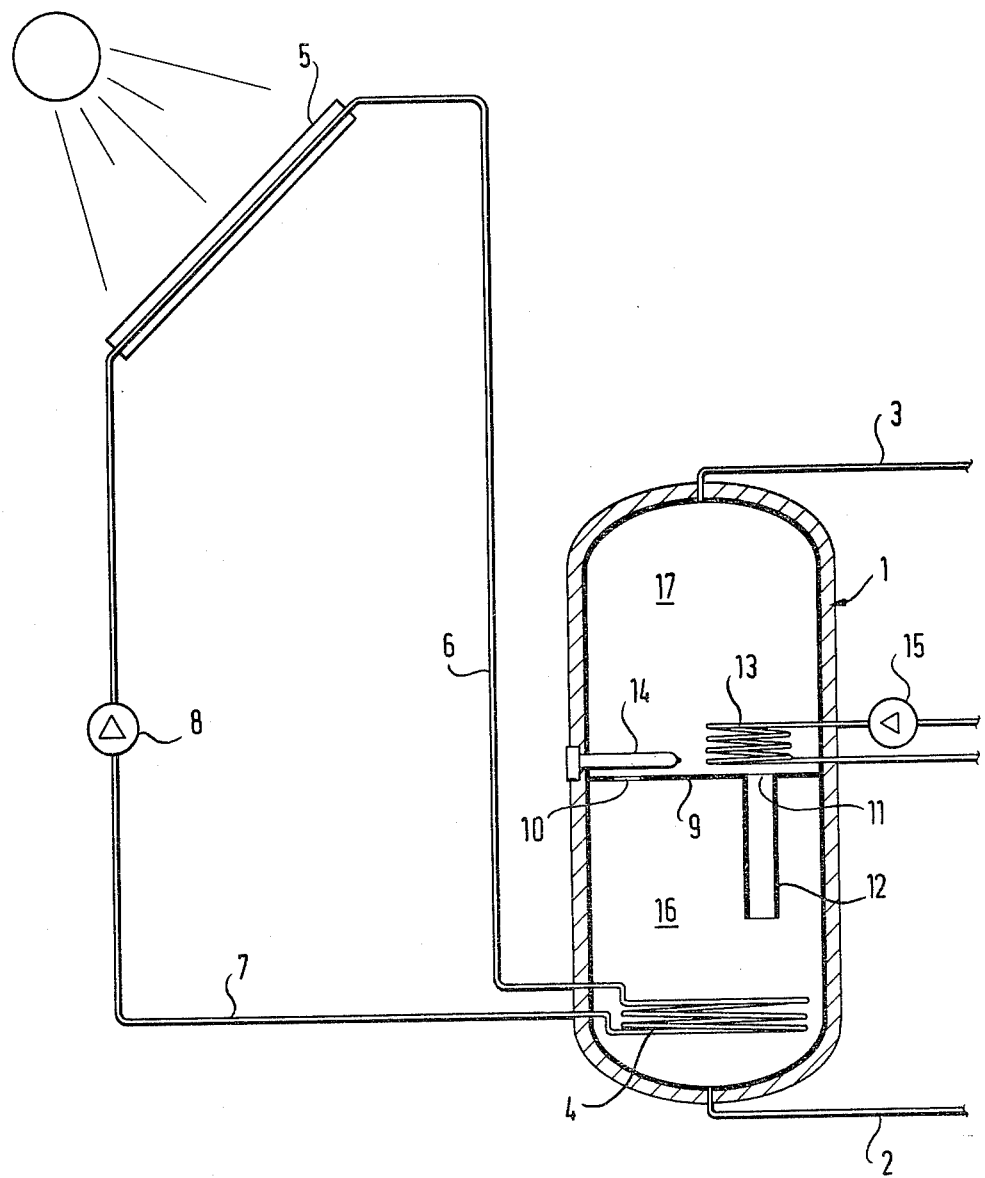

STORAGE RESERVOIRS FOR LIQUIDS HEATABLE BY SOLAR ENERGY

This invention relates to a reservoir for a liquid which is heated by solar energy and has particular reference to a water storage tank for a domestic water supply of the kind in which a heat exchanger, connectable into a solar energy receiving circuit, is disposed in the bottom portion of the storage tank and an auxiliary heating device is provided in the upper portion of the tank.

Known storage tanks of this kind generally suffer the disadvantage that the energy available from the solar receiver cannot be optimally used because the auxiliary heating device in the tank provides a temperature level in the water supply that is already in the range of, or even above, the temperatures which can be achieved in the solar heating circuit when comparatively little solar radiation is present. Because of this there is an insufficient temperature difference in the vicinity of the heat exchanger in the solar circuit and thus insufficient transfer of solar energy is possible in the desired sense.

The general warming of the stored water by the auxiliary heating device thus diminishes in an uncontrollable manner the storage capability for solar energy and this means that the possibility of using solar energy is excessively disadvantageously influenced; unless, that is, exceptionally powerful solar receivers are installed.

The object of the invention is to so construct a solar heated liquid reservoir of the previously described kind, using simple and economically realisable measures, that it is possible, under defined conditions, to continually achieve an optimal use of the energy potentially available from the solar collecting circuit.

This object is achieved in accordance with the invention by providing the reservoir with a separating wall which divides it into a lower tank containing the solar heat exchanger and an upper stand-by tank which contains the auxiliary heating device, and by providing at least two flow orifices in various quadrants of the surface of the dividing wall.

Through these measures a controlled and clear boundary is achieved between two regions of different temperatures, in surprisingly simple and effective manner, so that the auxiliary heating device, which is intended for use on rainy days and in the winter, only heats an exact determined amount of water in the stand-by tank to the desired tap temperature. The remaining region of the reservoir, namely the lower tank containing the solar heat exchanger, remains at a low temperature so that, on the one hand, heat losses are avoided and, on the other hand, optimal conditions for heat exchange are continually provided at the heat exchanger arranged at the base of the reservoir.

It is also of essential significance that if sufficient solar energy is available the resulting heating of water in the storage reservoir is not confined to that in the tank containing the solar heat exchanger but extends also to water in the stand-by tank. This is because the flow orifices in the separating wall make possible the movement of hot water into the stand-by tank under the effects of gravity and this makes it possible to heat the entire supply of water in the reservoir.

Preferably the separating wall is of substantially flat construction and disposed in a horizontal transverse plane of the reservoir. The amount of water in the stand-by tank is usefully chosen so that there is sufficient warm water for a household of four people; if the desired water temperature is 60° C. the corresponding quantity of water is 150 liters or 200 liters if the desired water temperature is 45° C.

The auxiliary heating device, which is typically either a heat exchanger and/or an electrical heating element, is usefully arranged within the stand-by tank adjacent the separating wall. In accordance with the basic underlying principle of the invention no disadvantages result from this location for the auxiliary heating device because the separating wall, which in accordance with a feature of the invention can be made of heat insulating construction, ensures a clear division between the temperature ranges of the two tanks.

The through flow orifices in the separating wall advantageously comprise two orifices located on a diameter of the separating wall and a flow tube is connected to the orifice which guides the flow into the lower tank.

These measures result in especially favourable guiding of the flow between the tanks by supporting a clear difference between the temperatures of the two tanks irrespective of whether the source of heat is solar energy or the auxiliary heating device.

It can also be useful to connect a further flow tube to the orifice which directs flow into the stand-by tank, the mouth of the further flow tube being above the auxiliary heating device so that, if necessary, flow tubes for directing the flow both upwardly and downwardly are provided.

The present invention also embraces the concept that a plurality of separating walls with suitably arranged flow orifices can be arranged generally parallel to each other.

If, for example, at least two such separating walls are provided, the through flow orifices of each of which are displaced relative to one another, then, heating of the water in the tank containing the solar heat exchanger by the auxiliary heating device is made more difficult and, simultaneously, heating of the water supply in the stand-by tank, by solar energy transferred from the solar heat exchanger is not impeded.

The invention will now be described by way of example only with reference to the single accompanying drawing which schematically illustrates a storage reservoir whose water content can be heated not only by a solar heating circuit but also by an auxiliary heating device.

As seen in the drawing the insulated storage reservoir 1 is supplied with cold water from a supply pipe 2 which opens into the base of the reservoir, and a warm water draw off pipe 3 is connected to the roof portion of the reservoir.

A heat exchanger 4 is arranged at the base of the reservoir 1 and is connected with a solar collecting device 5 by inflow and return flow pipes 6 and 7 respectively, there being a circulating pump 8 positioned in the return flow pipe.

Further details of the solar collecting circuit such as shut off valves, gravity brake, expansion vessel with membrane, safety valve, manometer and if necessary temperature sensor are not shown because they have no especial significance in the context of the present invention.

The reservoir 1 is divided into an upper stand-by tank 17 and a lower solar heat exchange tank 16 by a separating wall 9. The position of this separating wall is so chosen that the stand-by tank has a storage volume which contains sufficient warm water at a minimum temperature of 45° C. for a household of four people.

The volume of the stand-by tank generally lies in the range 150 to 200 liters.

The separating wall in the illustrated embodiment has two through flow orifices 10,11 which lie in different quadrants of the separating wall and preferably lie at opposite ends of a common diameter. A flow tube 12 is connected to the through flow orifice 11 and extends in the flow direction downwardly into the solar heat exchange tank.

A further flow tube 12 (not shown) which extends into that stand-by tank can likewise be connected to the through flow orifice 10 to guide flow upwardly into the stand-by tank.

An auxiliary heating device in the form of a heat exchanger 13 and/or an electrical heating element 14 are arranged in the stand-by tank in the immediate vicinity of the separating wall 9.

The heat exchanger 13 can be fed via a circulating pump 15 and, if both the heat exchanger and the heating element are provided, they are usefully both arranged in the same horizontal plane. By the provision of the separating wall 9, and the arrangement of either downward and/or upward flow tubes, at the through flow orifices 10,11 it is possible to have the desired amount of water at the required temperature in the stand-by tank largely without affecting the temperature of the water in the lower storage tank. Furthermore, so long as sufficient solar energy is available, the water in the stand-by tank is heated through solar energy.

The length of the flow tube 12 for directing flow into the solar heating tank is preferably at least equal to half the depth of this tank.

Thus, in all circumstances, the conditions necessary for optimal conversion of the solar energy are continuously present at the heat exchanger arranged at the base of the solar collecting circuit.

Whilst the above embodiment was concerned with a domestic hot water storage tank it will be understood that the system may readily be used in other circumstances such as the heating of water or other process liquid in an industrial installation.

I claim:

1. A domestic hot water heater comprising: an upright tank having a cold water inlet adjacent the bottom of the tank and a hot water outlet adjacent the top of the tank; a separating wall spaced from the bottom and the top of the tank and defining and separating an upper tank chamber and a lower tank chamber, the wall including only two, first and second, spaced apart apertures in respective quadrants of a surface of said wall which fluidly connect the chambers; a flow tube in communication with the first aperture and having a length at least equal to half the depth of the lower tank chamber and extending from said wall towards the tank bottom for guiding cold water from the upper tank chamber into the lower tank chamber; a heat exchanger positioned in the lower chamber proximate the tank bottom including means for connecting the heat exchanger to a solar energy receiving fluid circuit so that heated fluid from the circuit can flow through the heat exchanger to thereby heat the cold water in the vicinity of the bottom of the tank; and auxiliary heating means in the upper chamber for maintaining the water temperature in the upper chamber at a predetermined level above the ambient temperature; whereby the water temperature in the lower tank chamber proximate the tank bottom and the heat exchanger is at all times the lower water temperature in the tank so as to maximize the temperature gradient between the heat exchanger operated with solar energy and the surrounding water and to thereby maximize the efficiency of the heat exchanger, and whereby further water at the predetermined temperature level can at all times be withdrawn from the heater.

2. A reservoir according to claim 1 and in which the separating wall 9 is of substantially flat construction and is disposed in a horizontal transverse plane of the reservoir.

3. A reservoir according to claim 1 in which the separating wall is of heat insulating construction.

4. A reservoir according to claim 1 in which the two apertures are positioned spaced apart on a diameter of the separating wall.

5. A reservoir according to claim 1 in which the liquid capacity of the upper chamber lies in the range 150 to 200 liters.

6. A reservoir according to claim 1 in which said auxiliary heating device comprises an electrical heating element disposed immediately adjacent to the separating wall.

7. A reservoir according to claim 1 in which said auxiliary heating device comprises a heat exchanger disposed immediately adjacent to the separating wall.

8. A reservoir according to claim 1 in which said auxiliary heating device comprises both an electrical heating element and a heat exchanger and wherein both the electrical heating element and the heat exchanger are disposed immediately adjacent to the separating wall.

9. A reservoir according to claim 8 in which said electrical heating element and said heat exchanger are arranged at generally the same depth in the upper chamber.

* * * * *